Figure 1:
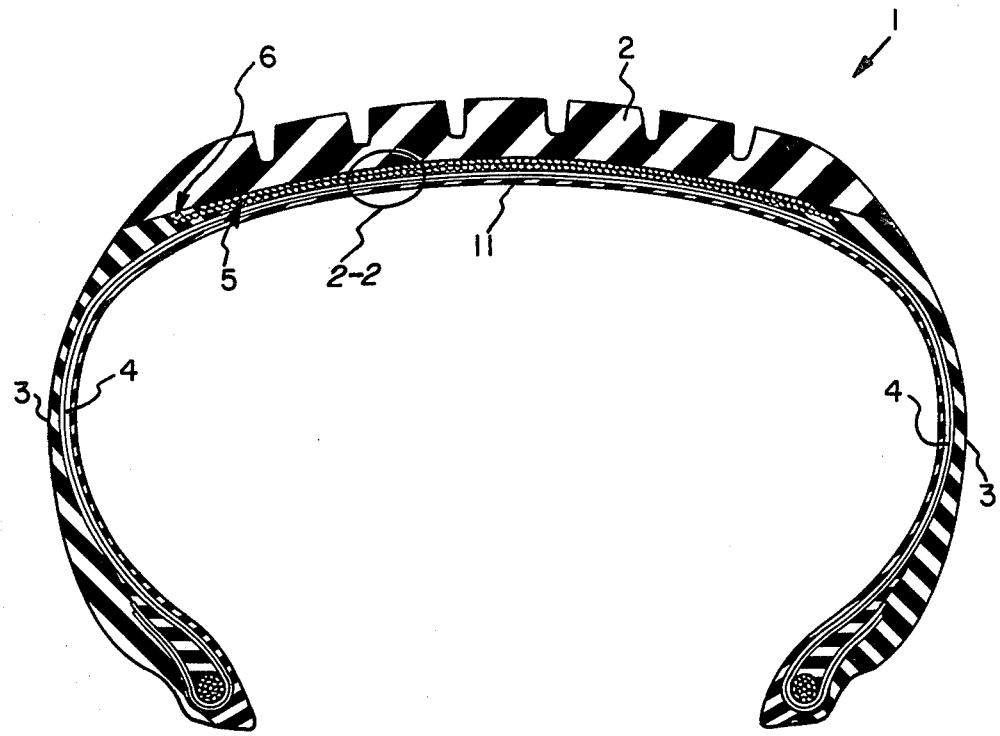

United States Patent [19]

Scriver

[11] Patent Number: 4,483,381

[45] Date of Patent: Nov. 20, 1984

[54] PNEUMATIC TIRE WITH BELT REINFORCEMENT

[75] Inventor: Richard M. Scriver, Atwater, Ohio

[73] Assignee: The Goodyear Tire & Rubber Company, Akron, Ohio

[21] Appl. No.: 472,906

[22] Filed: Mar. 7, 1983

[51] Int. Cl.[3] .............................................. B60C 17/00
[52] U.S. Cl. ..................................... 152/155; 57/902; 152/330 RF; 152/355; 152/356 R; 152/361 R; 152/361 DM; 428/295; 525/236
[58] Field of Search ............ 152/330 R, 155, 330 RF, 152/354 R, 354 RB, 355, 359, 356 R, 357 R, 361 R, 361 DM, 361 FP, 362 R, 374, 193, 197, 198; 57/902; 525/236; 428/295; 156/123, 124

[56] References Cited

U.S. PATENT DOCUMENTS 4,192,366  3/1980  Scriver et al. ................. 152/374 X
4,230,841  10/1980  Prudence ............................ 526/179

Primary Examiner—William A. Powell
Assistant Examiner—Thomas Bokan
Attorney, Agent, or Firm—H. C. Young, Jr.

[57] ABSTRACT

Pneumatic tire having circumferential fabric-reinforced rubber belt positioned between its tread and carcass where the rubber of the belt is comprised of medium vinyl polybutadiene, cis 1,4-polyisoprene and optionally, cis 1,4-polybutadiene. The invention is particularly directed to such tire where the medium vinyl polybutadiene rubber of said belt is a copolymer of 1,3-butadiene and a small amount of divinyl benzene.

10 Claims, 2 Drawing Figures

U.S. Patent  Nov. 20, 1984  4,483,381

PNEUMATIC TIRE WITH BELT REINFORCEMENT

FIELD

This invention relates to a pneumatic rubber tire containing a circumferential, fabric-reinforced rubber belt between its tread and supporting carcass.

BACKGROUND

Pneumatic tires are sometimes constructed with a circumferential belt reinforcement positioned in their crown portion between tread and carcass. Such construction is often used with radial ply carcass tires and sometimes with bias ply tires.

The belt is typically a fabric-reinforced rubber in the form of a rubber encapsulated textile fabric, or multiple filament, such as steel, glass, nylon, aramid or polyester.

The belt reinforcement is used, for example, to control or limit the outward expansion or deformation of the tire in service, to provide some stability for the overall tire construction and to aid in providing a strengthening interface between the carcass plies and tread rubber.

Another and important purpose is to limit the distortion, or squirming, of the tread element as the tire rotates across a substrate (the ground or pavement, for example) and the tread passes through its footprint against the substrate. At this point of contact a considerable and continuing flexing and distortion of the tire is observed in the region of the footprint. Belt reinforcement resists such distortion at the footprint which usually results in better tread wear characteristics. However, internal heat generation and temperature build-up within the tire and belt reinforcement as the tread distorts and moves through the footprint stresses the integrity of the belt reinforcement and may adversely affect its durability, particularly at the belt edges in the region of the tire sidewalls.

It is well recognized that the shoulder region of the tire undergoes a large amount of flexing and distortion when the tire is used in service, particularly under load. As a result, it is the shoulder region of the tire in which a substantial amount of heat build-up occurs, resulting in an increased tire running temperature in this region. Therefore heat durability of a tire reinforcing belt positioned between its tread and carcass, particularly at the belt edges in the shoulder region of the joining of tread and sidewall, is an important concern.

DISCLOSURE AND PRACTICE OF THE INVENTION

In one aspect of the invention, it is desired to provide a pneumatic tire construction having a reinforcing belt positioned between its tread and carcass.

In accordance with this invention, a pneumatic rubber tire is provided comprised of a toroidal shaped fabric-reinforced rubber carcass and an outer circumferential rubber tread, two spaced substantially inextensible beads and two sidewalls extending radially from and connecting said tread to said beads, said tire characterized by having a circumferential fabric reinforced rubber belt positioned between said tread and supporting carcass where the rubber of said belt is comprised of (A) about 10 to about 45, preferably about 15 to about 30, weight percent medium vinyl polybutadiene rubber, (B) about 55 to about 90, preferably about 70 to about 85, weight percent cis 1,4-polyisoprene rubber selected from at least one of natural rubber and synthetic cis 1,4-polyisoprene and (C) about 0 to about 30, preferably either zero or about 10 to about 25, weight percent cis 1,4-polybutadiene rubber.

In the practice of this invention, the circumferential tire-reinforcing belt extends across the crown portion of the tire where the outer edge portion of the belt terminates in the shoulder region of the tire. (Region of tread joining sidewall.)

In the further practice of this invention, the tire tread, sidewalls, rubber portion of the carcass, and various other rubber components of the tire, including the rubber portion of the reinforcing belt are composed of rubber compounded with conventional compounding ingredients such as carbon black, sulfur, accelerator(s), antidegradants, zinc oxide, processing oil and fatty acid or metal salt thereof such as stearic acid or zinc stearate.

For example, the reinforcing-belt rubber may be comprised of the prescribed rubber composition and about 0 to about 10 phr rubber processing oil, about 20 to about 70 phr carbon black, about 2 to about 10 phr zinc oxide, about 1 to about 5 phr stearic acid and/or zinc stearate, about 0.5 to about 2 phr cure accelerator(s), about 0.5 to about 5.0 sulfur.

The phr refers to parts by weight of specified material or ingredient per 100 parts by weight rubber.

Such belt rubber composition is considered to be general in nature and selection and quantity of ingredients may be optimized for special applications.

The reinforcing belt rubber is preferably composed of a blend of medium vinyl polybutadiene rubber and natural and/or synthetic cis 1,4-polyisoprene rubber. Preferably, the cis 1,4-polyisoprene is natural rubber. If desired, a portion of the cis 1,4-polyisoprene can be replaced with cis 1,4-polybutadiene rubber.

The cis 1,4-polyisoprene rubber typically has a cis 1,4-content in the range of about 96 to about 99 percent.

The cis 1,4-polybutadiene rubber is of the conventional low vinyl 1,2-content in the range of about 2 to about 10 percent with a major portion being a cis 1,4-structure.

The medium vinyl 1,2-polybutadiene rubber generally has a medium vinyl 1,2-content in the range of about 25 to about 50 percent. The remainder of the polymer structure of the vinyl 1,2-polybutadiene is largely cis and trans 1,4-structure.

In the practice of this invention, the low vinyl and medium vinyl content of the polybutadiene rubber refers to the weight percent of monomer content of the polymer in the 1,2-configuration. The low vinyl polybutadiene is generally considered to be what is thought of as a somewhat conventional polybutadiene.

The invention can be practiced with medium vinyl polybutadiene rubber produced by various processes, such as those already known in the art such as by polymerizing 1,3-butadiene in an aromatic solvent with an alkyl lithium catalyst with one or more polar catalyst modifiers.

A preferred medium vinyl polybutadiene is of the type prepared by copolymerizing 1,3-butadiene with a very small amount of divinyl benzene in a hydrocarbon solvent system, preferably an essentially non-polar aromatic solvent, with an alkyl lithium catalyst, and one or more polar catalyst modifiers to effect the polymer's vinyl content. For further details concerning an example of such type of medium vinyl polybutadiene and a method of preparation, reference may be made to U.S.

Pat. No. 4,230,841 and such patent is hereby incorporated herein by reference.

The tire can be built, shaped, molded and cured by various methods which will be readily apparent to those having skill in the art.

The tread rubber is typically a sulfur vulcanized high unsaturation diene rubber, or blend thereof. Representative of such high unsaturation rubbers, are natural rubber and synthetic rubbery polymers of cis 1,4-polyisoprene, cis 1,4-polybutadiene, vinyl 1,2-polybutadiene, styrene/1,3-butadiene copolymer and medium vinyl styrene/1,3-butadiene copolymer rubber.

The styrene/1,3-butadiene rubber can be of the aqueous emulsion polymerization or the hydrocarbon solvent solution polymerization derived types and conventionally contains about 5 to about 15, usually about 8 to 12, percent vinyl 1,2-content. The medium vinyl styrene/1,3-butadiene rubber contains about 15 to about 50, preferably about 20 to about 45, percent vinyl 1,2-content of the type usually prepared by solution polymerizing the monomers in the presence of a polar modifier.

The supporting carcass rubber is typically at least one sulfur vulcanized high unsaturation diene rubber, or blend thereof. Representative of such rubbers are natural rubber (cis, 1,2-polyisoprene), cis 1,4-polybutadiene and styrene/butadiene rubber.

The rubber, and rubber compounding ingredients can be mixed by conventional rubber mixing methods.

The belt can typically be applied in the building of the green tire in which the uncured belt is built prior to the tread member following which the green tire is shaped and cured.

It is understood that the tire carcass rubber, which supports the tread may contain filament reinforcement and additives to enhance rubber adhesion to the filaments. Such filaments can be selected from at least one of metal, organic and inorganic filaments and are conventionally in the form of a twisted cable, or cord, of a multiple of such filaments.

The term "pneumatic tire" is used herein to refer to tires of both the pneumatic and semi-pneumatic type. Conventionally, pneumatic tires rely upon an internal air pressure to maintain its shape when mounted on a rim and placed under load, whereas a semi-pneumatic tire, although containing a gas such as air which might be under pressure in the tire cavity, does not completely rely upon the gas for support of the tire itself.

The invention can be further understood with respect to the accompanying drawing wherein FIG. 1 is a side elevational view of a cut-away portion of a section of a shaped, molded and cured pneumatic rubber tire in which a circumferential reinforcing belt is positioned between its tread and supporting carcass.

Figure 2:
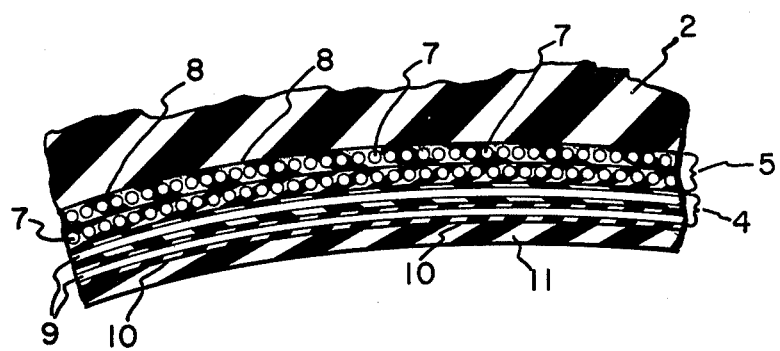

FIG. 2 is an enlarged cross-sectional view of a portion of the tire of FIG. 1 taken from the position at 2—2 showing the cord ends of a circumferential reinforcing belt imbedded in rubber ply stock between the tread and radial ply carcass.

Referring to the drawing, a tire 1 is provided having a tread 2, supporting radial ply carcass 4 and sidewalls 3 and a two-ply, circumferential fabric reinforced belt 5 positioned between the tread 2 and carcass 4. The end portion 6 of the belt 5 terminates in the shoulder region of the tire in the vicinity of where the sidewall 3 joins the tread 2.

In particular, as more clearly shown in FIG. 2, the said reinforcing, circumferential, belt 5 is composed of a brass-plated steel cord reinforced rubber stock 8 as shown in FIG. 2 depicting the ends of the cord 7 encapsulated between rubber stock 8. The rubber stock 8 is composed of a blend of medium vinyl polybutadiene and both natural and synthetic cis 1,4-polyisoprene in accordance with the practice of this invention.

The fabric-reinforced supporting carcass 4 is a two-ply structure composed of radial cords 9 imbedded in rubber 10 to which a tire inner liner 11 is positioned.

The practice of this invention is further illustrated by reference to the following examples which are intended to be representative rather than restrictive of the scope of the invention. Unless otherwise indicated, all parts and percentages are by weight.

EXAMPLE 1

Rubber compositions were formulated to prepare a fabric-reinforced belt by calendering rubber onto a steel cord belt. The rubber was comprised of the general recipe shown in Table 1. The belt was about 0.1 inch (0.25 cm) thick and composed of two brassplated steel cord reinforced rubber plies similar to FIG. 1 of about equal thicknesses with bottom ply (next to carcass) having a width of about 6.4 inches (16.3 cm) and top ply (next to tread) having a width of about 5.9 inches (15.1 cm). In Table 1, formulation B is experimental and represents the practice of this invention and the use of medium vinyl polybutadiene in the cord-reinforced belt environment. In formulation A, a control comprised of a more conventional rubber mixture is shown.

Pneumatic tires of conventional construction (grooved tread, belt reinforcement, sidewalls, spaced beads, and supporting fabric-reinforced carcass) were built, shaped and cured in a conventional tire mold. The tires were steel belted radial passenger tires designated as P215/75R15 size which was a radial ply polyester cord-reinforced carcass with circumferential steel cord reinforced belts.

As shown in Table 1, the belt rubber compound of the conventional control sample (A) was composed of 50 parts natural cis 1,4-polyisoprene rubber and 50 parts synthetic cis 1,4-polyisoprene rubber and experimental sample (B) was composed of 40 parts natural rubber, 40 parts synthetic cis 1,4-polyisoprene rubber and 20 parts medium vinyl polybutadiene rubber.

TABLE 1

| Components | (Control) A | (Experimental) B |
|---|---|---|
| Natural Rubber (cis 1,4-polyisoprene) | 50 | 40 |
| Synthetic rubber (cis 1,4-polyisoprene) | 50 | 40 |
| Medium vinyl polybutadiene[1] | 0 | 20 |
| Carbon black (ISAF) | 50 | 50 |
| Processing Oil | 2 | 2 |
| Antioxidant | 2 | 2 |
| Accelerator | 0.6 | 0.6 |
| Zinc Oxide | 8 | 8 |
| Sulfur | 2.5 | 2.5 |

[1]The medium vinyl polybutadiene rubber had a vinyl 1,2-content of about 45% and was prepared by copolymerizing 1,3-butadiene with a very small amount of divinyl benzene in an essentially non-polar aromatic solvent with alkyl lithium catalyst and polar modifiers.

The compounds (A and B) shown in Table 1 where mixed, and calendered onto a brass-coated steel cord belt. The belt was build onto the radial ply carcass as the hereinbefore indicated two plies and then the tread and sidewalls. The tires A abd B corresponding to belt compounds A and B were molded through shaping and curing under pressure to form the resulting vehicular tires.

Samples of such compounded rubber (A and B) were cured and tested for adhesion to brass-coated steel cords. The results of the test are shown in Table 2.

TABLE 2

| Conditions[1] | Results | |
|---|---|---|
| | Control Composition A | Experimental Composition B |
| Original Adhesion (93° C.) | 282 | 285 |
| Aged Adhesion | | |
| 10 days, 100° C. water vapor | 168 | 143 |
| 10 days, 120° C. nitrogen atmosphere | 337 | 345 |
| 20 days, 120° C. nitrogen atmosphere | 240 | 397 |

[1]The test was conducted by curing two blocks of the compounded rubber blend together with two brass-plated opposing steel wires therebetween applying pull-out tension to the wires, and then measuring the amount of force required to pull at least one of the wires from the rubber block sandwich. The blocks were approximately 0.5 inch (0.13 cm) thick and approximately 1 inch (2.5 cm) square.

The substantial improvement in aged adhesion particularly shown in the 20 day elevated temperature nitrogen atmosphere test confirmed earlier test sample results (nitrogen atmosphere) upon which it was considered that a tire trial was justified.

The tires with tread compositions (A and B) were pre-aged, mounted on rims, inflated and submitted to testing. They had been pre-aged by a six hour exposure to 4 psi steam. The tires were tested at a slip angle by running against a motor-driven dynamometer under a load of about 1380 pounds (627 kg) for an equivalent vehicular speed of about 87 miles per hour (48 kph) for 174 minutes or until failure, whichever first occurred.

This test was termed a slip angle test because the tire was mounted at an angle of 3° from a normal right angle to the dynamometer in order to create a large distortion in the contact area "footprint" and therefore cause a substantial heat build-up in the shoulder region of the tire. In this manner the shoulder region (which contains the end portion of the belt) is distorted substantially more than normal. The visual appearance is that the tread is trying to pull away from the sidewall, which therefore puts a considerable stress at the belt edge.

The results of the slip angle dynamometer test on the tires A and B are shown in the following Table 3 as "minutes to failure" where the control tires failed after 110 and 78 minutes, respectively, and the experimental tires had not failed by the end of the test (174 minutes).

Two tires of each of the Control A and Experimental B tires were submitted to a cleated wheel test where they were tested by running against a 67.2 inch (171 cm) diameter cleated motor-driven dynamometer under a load of about 1510 pounds (686 kg) for an equivalent vehicular speed of 45 miles per hour (25 kph) until failure at the belt edge (shoulder region of the tire. The dynamometer surface contained six equally spaced apart cleats 0.75 inch (1.9 cm) high and 2 inches (5 cm) wide.

The results of the cleated wheel test are shown in Table 3 for an original rating in which newly prepared tires were tested and for a residual rating after the tires were run on a road vehicle for 10,000 miles. The mileage to failure results were normalized for the control tires (A) to a value of 100 and the mileage to belt failure for the experimental tires (B) was proportionately compared therewith. Inspection of Table 3 readily shows that the original rating for the experimental tire was twenty percent better than for the control tire.

TABLE 3

| | Tire Test Results | |
|---|---|---|
| | Control A | Experimental B |
| Minutes to failure 1st tire | 110[1] | 174[2] |
| (SLIP ANGLE TEST) 2nd tire | 78[1] | 174[2] |
| Original Rating (cleated wheel) (average 2 tires) | 100 | 120 |
| Residual Rating (cleated wheel) (average 2 tires) | 100 | 106 |

[1]Internal belt failure as evidenced by visual tread distortion and by inspection of tire cross-section.
[2]Test stopped after 174 minutes - no belt failure observed upon cutting and inspecting tire cross-section.

Various filaments can be used for the fabric-reinforced belt used in this invention. Typically such filaments, except for mono-filament reinforcement, are cabled together to form cords thereof. Representative of various filaments are steel, glass, nylon, aramid, polyester and metal alloy-coated steel. The steel is typically a metal alloy-coated steel wire such as brass-coated steel filament or wire.

Medium vinyl polybutadiene, including the preferred medium vinyl polybutadiene as a copolymer with divinyl benzene has heretofore been used or has been suggested for use as a tread rubber or as a blend with other rubbers in a tire tread. However, it is considered that this invention is clearly a departure from such earlier teaching because of the different fabric reinforced internal belt environment and the discovered beneficial heat-aged belt durability in static aging conditions and under severe tire service.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic rubber tire comprised of a toroidal shaped fabric-reinforced rubber carcass and an outer circumferential rubber tread, two spaced substantially inextensible beads and two sidewalls extending radially from and connecting said tread to said beads, said tire characterized by having a circumferential fabric reinforced rubber belt positioned between said tread and supporting carcass where the rubber of said belt is comprised of (A) about 10 to about 45 weight percent medium vinyl polybutadiene rubber, (B) about 55 to about 90 weight percent cis 1,4-polyisoprene rubber selected from at least one of natural rubber and synthetic cis 1,4-polyisoprene and (C) about 0 to about 30 weight percent cis 1,4-polybutadiene rubber.

2. The tire of claim 1 where said belt extends across the crown portion of the tire and the outer edge portions of the belt terminate in the shoulder region of the tire.

3. The tire of claim 2 where the rubber of said belt is comprised of (A) about 15 to about 30 weight percent polybutadiene rubber having a vinyl 1,2-content in the range of about 25 to about 50 percent and (B) about 70 to about 85 weight percent cis 1,4-polyisoprene rubber.

4. The tire of claim 2 where the fabric for said belt is composed of cords of at least one selected from the group of glass, nylon, aramid, polyester and metal alloy-coated steel filament.

5. The tire of claim 2 where the fabric for said belt is composed of cords of at least one brass-coated steel filament.

6. The tire of claim 2 where the rubber of said belt is comprised of (A) about 15 to about 30 weight percent medium vinyl polybutadiene rubber having a vinyl 1,2-content in the range of about 25 to about 50 percent, (B) about 70 to about 85 weight percent cis 1,4-polyisoprene rubber and (C) about 10 to about 25 weight percent cis 1,4-polybutadiene rubber and where the fabric for said belt is composed of cords of at least one selected from the group of glass, nylon, aramid, polyester and coated steel filament.

7. The tire of claim 1 wherein the medium vinyl polybutadiene rubber has a vinyl 1,2-content in the range of about 25 to about 50 and is prepared by copolymerizing 1,3-butadiene and a small amount of divinyl benzene in essentially non-polar aromatic solvent and one or more polar modifiers.

8. The tire claim 7 wherein the rubber of said belt is composed of (A) said medium vinyl polybutadiene rubber as a copolymer with divinyl benzene and (B) cis 1,4-polyisoprene rubber and where said belt extends across the crown portion of the tire and the outer edge portions of the belt terminate in the shoulder region of the tire and where the fabric of said belt is composed of cords of at least one selected from the group of glass, nylon, aramid, polyester and metal alloy-coated steel filament.

9. The tire of claim 8 where the fabric of said belt is composed of cords of at least one brass-coated steel filament.

10. The tire of claim 7 where the rubber of said belt is composed of (A) said medium vinyl polybutadiene copolymer, (B) cis 1,4-polyisoprene rubber and (C) cis 1,4-polybutadiene and where the fabric of said belt is composed of cords of at least one selected from the group of glass, nylon, aramid, polyester and metal alloy-coated steel filament.

* * * * *